United States Patent
Manuel et al.

(10) Patent No.: US 7,610,587 B2
(45) Date of Patent: Oct. 27, 2009

(54) SYSTEM AND METHOD FOR CREATING A BEST-MATCH OBJECT AT RUN TIME

(75) Inventors: John L. Manuel, Camas, WA (US); Timothy McAllister, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 10/702,151

(22) Filed: Nov. 5, 2003

(65) Prior Publication Data
US 2005/0097510 A1 May 5, 2005

(51) Int. Cl.
*G06F 9/54* (2006.01)
*G06F 17/60* (2006.01)

(52) U.S. Cl. .......................................... 719/315; 705/7
(58) Field of Classification Search ................. 719/315; 705/7
See application file for complete search history.

(56) References Cited

U.S. PATENT DOCUMENTS

| | | | |
|---|---|---|---|
| 5,860,004 A | 1/1999 | Fowlow et al. | |
| 5,926,775 A * | 7/1999 | Brumley et al. | 702/127 |
| 5,951,680 A | 9/1999 | Redlin et al. | |
| 5,995,753 A | 11/1999 | Walker | |
| 6,032,152 A | 2/2000 | Pearson | |
| 6,163,806 A * | 12/2000 | Viswanathan et al. | 709/229 |
| 6,289,500 B1 | 9/2001 | Baxter et al. | |
| 6,477,520 B1 * | 11/2002 | Malaviya et al. | 706/47 |
| 6,502,103 B1 | 12/2002 | Frey et al. | |
| 6,725,300 B1 * | 4/2004 | Hisamatsu et al. | 710/62 |
| 6,931,105 B2 * | 8/2005 | Groves et al. | 379/88.03 |
| 7,181,382 B2 * | 2/2007 | Shier et al. | 703/13 |
| 2003/0212673 A1 * | 11/2003 | Kadayam et al. | 707/3 |
| 2003/0217137 A1 * | 11/2003 | Roese et al. | 709/223 |
| 2004/0136027 A1 * | 7/2004 | Zehler | 358/1.15 |
| 2004/0210661 A1 * | 10/2004 | Thompson | 709/228 |
| 2005/0086300 A1 * | 4/2005 | Yeager et al. | 709/204 |

\* cited by examiner

*Primary Examiner*—Hyung S Sough
*Assistant Examiner*—Abdou K Seye (57) ABSTRACT

An object generator includes an object factory and a pool of object proxies. The object factory forwards indicia of a desired object responsive to a system need. The object factory polls a plurality of object proxies for a respective confidence level responsive to the indicia and the object proxy's capability for producing the desired object.

33 Claims, 6 Drawing Sheets

SYSTEM AND METHOD FOR CREATING A BEST-MATCH OBJECT AT RUN TIME

BACKGROUND

Object-oriented technology continues to be an increasingly important tool for generating portable application code that can be readily used and reused. A basic premise of object-oriented technology is the use of objects. An object is a run-time entity with a specific set of instance methods and variables associated therewith.

In an effort to enhance the usability, portability, reliability and interoperability of objects, certain standards have been created. One group responsible for such standardization is referred to as the Object Management Group (OMG), which is a consortium of corporations, businesses and users interested in promoting object-oriented technology.

The Object Management Group has taken great steps in its standardization efforts. For example, the OMG is responsible for the creation of an object request broker (ORB), which is used to provide communications between clients and servers within a computing environment. The ORB is based upon an architecture touted by OMG and referred to as the Common Object Request Broker Architecture (CORBA).

One goal of the OMG is to provide distributed object-oriented applications and systems that coincide with the needs and desires of the ever-changing computing industry. This goal includes supporting communicatively coupled peripheral devices that may or may not have been supported at the time when an embedded or mobile-computing device was programmed.

Although efforts have been made to meet the goals of the OMG, and of the object-oriented industry as a whole, further enhancements are still needed. For example, a need exists for an object-oriented computing environment that provides for the dynamic creation of objects to meet system needs.

SUMMARY

An embodiment of an object generator includes an object factory and a pool. The object factory polls proxies located in the pool to identify the proxy capable of producing a best-match object for a system need. The pool receives indicia of the desired object from the object factory and each of the proxies returns a confidence level responsive to the indicia. The proxy returning the greatest confidence level is directed to create the best-match object.

BRIEF DESCRIPTION OF THE DRAWINGS

Systems and methods for creating a best-match object at run time are illustrated by way of example and not limited by the implementations in the following drawings. The components in the drawings are not necessarily to scale emphasis instead is placed upon clearly illustrating the present systems and methods. Moreover, in the drawings, like reference numerals designate corresponding parts throughout the several views.

DETAILED DESCRIPTION

An object generator according to one embodiment of the invention includes an interface configured to receive information identifying a peripheral device that a user of a computing device would like to interface with in some way. The information may include a device identification string generated by the peripheral device and communicated to the object generator. In other embodiments, the information may include a device identification string or other identifier that only partially describes the peripheral device that the user would like to use. For example, when the peripheral device is a printer that is not configured to communicate a device identifier, a user of the computing device may be prompted to enter the name of the manufacturer, the model number, or some other information, such as the number and type of pens in the printer. The information provided by the user of the computing device is communicated to the object generator.

In response to receiving information identifying a peripheral device, the object generator polls a plurality of previously stored proxies that each represent the capability of a corresponding object that each individual proxy is designed to generate to the object generator. In one example, the separate proxies return a confidence level ranging from a minimum confidence level (i.e., the created object will very likely not be able to work with the peripheral device) to a maximum confidence level (i.e., the created object will be able to work with the peripheral device). A maximum confidence level might be communicated when the proxy is configured to produce an object designated for the identified peripheral device. When a maximum confidence level is identified, the object generator directs the proxy associated with the maximum confidence level to generate the object. The dynamically generated object can then be linked or otherwise made available to various applications operable on the computing device.

The object generator records a confidence level received from each of the proxies. In one embodiment, once a first confidence level is received, the object generator compares each subsequent confidence level with the confidence level received from the previous proxy. The object generator records an identifier associated with the proxy that returned the greater confidence level. Once all the proxies have been polled, the object generator directs the proxy that provided the greatest confidence level to create an object for the computing device.

The object generator allows a software system to dynamically create different objects at run time based on a user input or information from other devices or software. The object generator and methods for creating a best-match object at run time enable the software system to generate and use objects that may not represent a confirmed match with a desired device. Stated another way, an object factory can generate and use a best-match object to handle a request, even when the system cannot determine with a complete certainty that the generated object is a match. This capability to generate and use a best-match object is especially useful for systems where a degraded result is preferred over no result at all and an error message.

The object generator is efficient in that information that describes what the object can do is encapsulated in a relatively small object proxy. The object generator can poll a plurality of object proxies without incurring the overhead associated with loading each object to determine if it is the correct object. In addition, the object generator is extremely flexible in that new object classes can be dynamically added to a software system by registering new object proxies with the object generator. New object proxies can be registered as they become available or in response to an object request. Moreover, the object generator is decoupled from the objects generated by the various object proxies.

Figure 1:
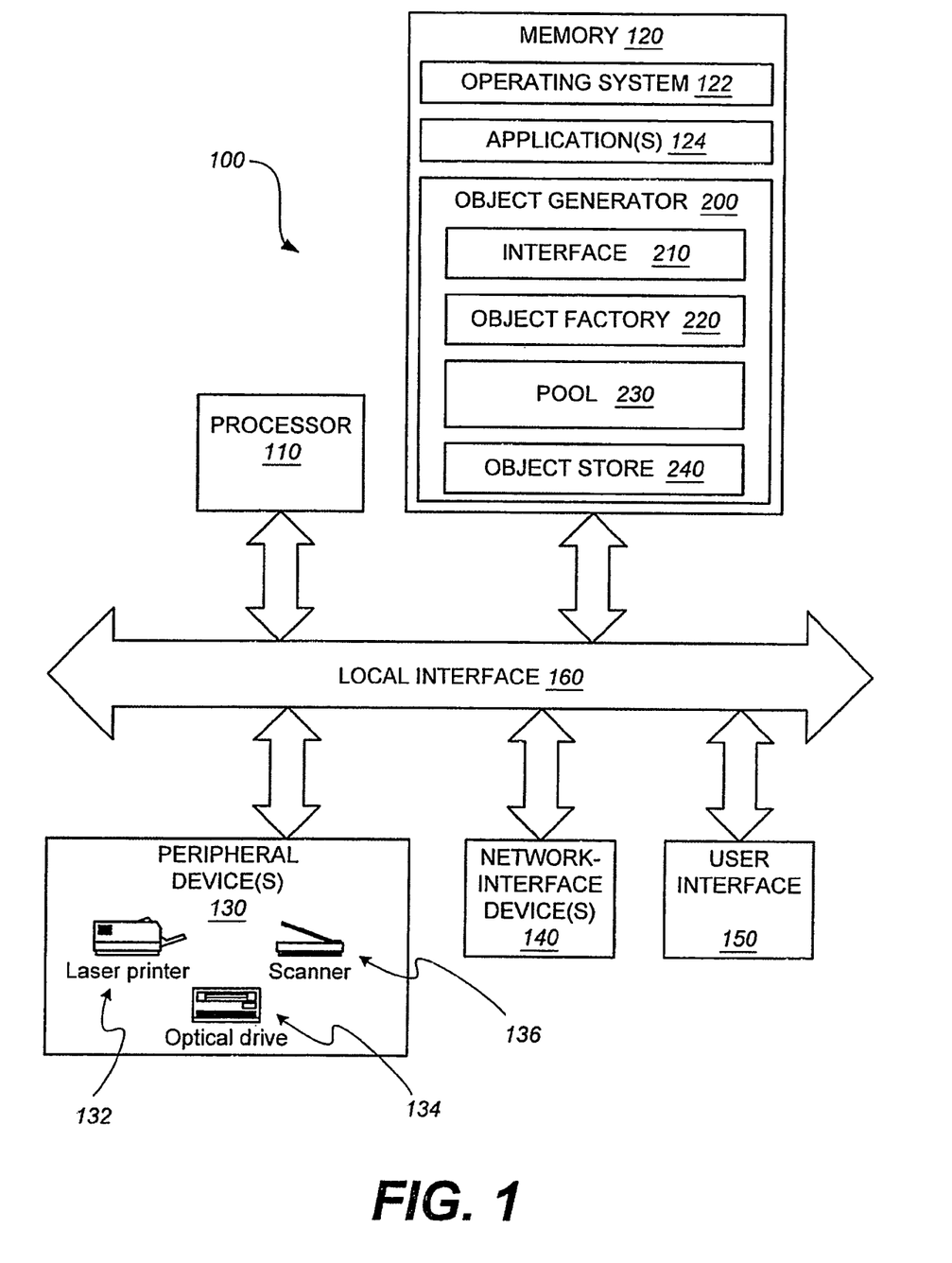
FIG. 1 is a functional block diagram of an embodiment of a computing device.

Turning now to the drawings, reference is made to FIG. 1, which illustrates a functional block diagram of a computing device. Generally, in terms of hardware architecture, as shown in FIG. 1, computing device 100 includes a processor 110, memory 120, peripheral device(s) 130, network interface device(s) 140, and a user interface 150 that are communicatively coupled via local interface 160. The local interface 160 can be, for example but not limited to, one or more buses or other wired or wireless connections, as known in the art or that may be later developed. Local interface 160 may have additional elements, which are omitted for simplicity, such as controllers, buffers (caches), drivers, repeaters, and receivers, to enable communications. Further, local interface 160 may include address, control, and/or data connections to enable appropriate communications among the aforementioned components.

In the embodiment of FIG. 1, the processor 110 is a hardware device for executing software that can be stored in memory 120. The processor 110 can be any custom-made or commercially available processor, a central processing unit (CPU) or an auxiliary processor among several processors associated with the computing device 100. In some embodiments, processor 110 is a semiconductor-based microprocessor (i.e., a microchip) or an application-specific integrated circuit (ASIC).

Memory 120 includes any one or combination of volatile memory elements (e.g., random access memory (RAM, such as dynamic RAM or DRAM, static RAM or SRAM, etc.)) and nonvolatile memory elements (e.g., read-only memory (ROM), hard drives, tape drives, compact discs (CD-ROM.). Moreover, the memory 120 may incorporate electronic, magnetic, optical, and/or other types of storage media. Note that memory 120 can have a distributed architecture, where various components are situated remote from one another, but accessible by processor 110.

The software in memory 120 may include one or more separate programs, each of which comprises an ordered listing of executable instructions for implementing logical functions. In the example of FIG. 1, software in memory 120 includes an operating system 122, one or more application(s) 124, and an object generator 200. Application(s) 124 and object generator 200 function as a result of and in accordance with operating system 122. Operating system 122 controls the execution of the other application(s) 124 and computer programs, such as object generator 200, and provides scheduling, input-output control, file and data management, memory management, and communication control and related services.

Object generator 200 and application(s) 124 include one or more source programs, executable programs (object code), scripts, or other collections each comprising a set of instructions to be performed. As will be explained in detail below, object generator 200 includes logic that controls the execution of application(s) 124. More specifically, object generator 200 includes logic that controls the execution of an interface 210, object factory 220, and a pool 230 to dynamically create one or more objects that can be stored in object store 240 or linked to the application(s) 124. It should be well understood by one skilled in the art, after having become familiar with the object generator 200, that object generator 200 and application(s) 124 may be written in a number of programming languages now known or later developed that support the creation and integration of objects. Moreover, object generator 200 and application(s) 124 may be stored across distributed memory elements in contrast with the single memory element (i.e., memory 120) shown in FIG. 1.

The peripheral device(s) 130 may take the form of human/machine devices such as but not limited to, a keyboard, a mouse or other suitable pointing device, a microphone, etc. Moreover, as illustrated in FIG. 1, the peripheral device(s) 130 can include laser printer 132, optical drive 134, and scanner 136, among other peripheral devices (not shown). Furthermore, the peripheral device(s) 130 may also include various models of known or later developed input/output devices, for example but not limited to, printers, display devices, etc.

Network-interface device(s) 140 include a host of devices that establish one or more communication sessions between computing device 100 and one or more local and/or wide area networks (not shown). Network-interface device(s) 140 may include but are not limited to, a modulator/demodulator or modem (for accessing another device, system, or network); a radio frequency (RF) or other transceiver; a telephonic interface; a bridge; an optical interface; a router; etc. For simplicity of illustration and explanation, these two-way communication devices are not shown.

It is often the case that computing device 100 is not entirely configured to operate the select device. For example, when the computing device 100 is a mobile-computing device that an operator desires to use in conjunction with a client's network. Generally, to print information stored or otherwise accessible via the mobile-computing device, the operator has to locate and identify a select printer available on the network. After identifying the select printer, many applications 124 require a printer specific device driver before the applications 124 can print information on the printer. As explained in further detail below, object generator 200 can be used to identify a best-match proxy configured to create an object, in the examples below, a driver that can be used to render data on a select printer.

User interface 150 enables an operator of the computing device 100 to selectively enter information that can be used by the object generator 200 to create a best-match object. User interface 150 forwards one or more parameters that identify a specific peripheral device 130 such as printer 132 that an operator of the computing device 100 desires to use. Identifying parameters may include a manufacturer name, a model number, a trade name for a family of closely related devices, etc. When the peripheral device 130 is a printer that is not configured to forward an identification string to a coupled computing device, user interface 150 prompts the operator for information about the printer. For example, user interface 150 may prompt a user to enter a manufacturer, a series or family identifier, a model number, and may further ask the operator if the printer is capable of producing color or if the printer supports other functions. When an operator responds that the select printer is color capable, user interface 150 may prompt the operator for information regarding the printer pens installed in the printer.

When the peripheral device 130 is a printer such as a Hewlett-Packard DeskJet® 995c printer, which includes a Bluetooth® wireless interface, information identifying the printer and its capabilities can be communicated to computing device 100. The object generator 200 can then search for a best-match driver to support the DeskJet® 995c model printer. DeskJet® is the registered trademark of the Hewlett-Packard Company of Palo Alto, Calif., U.S.A. Bluetooth® is the registered trademark of Bluetooth Sig, Inc.

When the computing device 100 is in operation, the processor 110 is configured to execute software stored within the memory 120, to communicate data to and from the memory 120, and to generally control operations of the computing device 100 pursuant to the software. Operating system 122, one or more application(s) 124', and the object generator 200, in whole or in part, but typically the latter, are read by the processor 110, perhaps buffered within the processor 110, and then executed in accordance with the respective instructions.

As further illustrated in FIG. 1, object generator 200 includes an interface 210, an object factory 220, a pool 230, and an object store 240. Interface 210 receives an identification string generated by a peripheral device 130 or one or more information strings entered by an operator of computing device 100. Object factory 220 receives the identification string(s) and polls a plurality of object proxies stored in pool 230 to determine a best-match object proxy for communicating with or otherwise using the peripheral device 130. Each of the plurality of proxies stored in pool 230 is configured to return a confidence level within a confidence range to the object factory 220. The object proxy that responds with the highest confidence level that the object it will produce is the correct object for operating with the identified peripheral device 130 is directed by the object factory 220 to generate a corresponding object. The object generator 200 then stores the object in object store 240 or otherwise links the object to one or more applications 124.

It should be understood that object generator 200 can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

Those skilled in the art will understand that various portions of object generator 200 can be implemented in hardware, software, firmware, or combinations thereof. In a preferred embodiment, object generator 200 is implemented using software that is stored in memory 120 and executed by a suitable instruction execution system. If implemented solely in hardware, as in an alternative embodiment, object generator 200 can be implemented with any or a combination of technologies well-known in the art (e.g., discrete logic circuits, application specific integrated circuits (ASICs), programmable gate arrays (PGAs), field programmable gate arrays (FPGAs), etc.), or technologies later developed.

In a preferred embodiment, the object generator 200 is implemented via a combination of software and data stored in memory 120 and executed and stored or otherwise processed under the control of processor 110. It should be noted, however, that object generator 200 is not dependent upon the nature of the underlying processor 110 or memory 120 in order to accomplish designated functions.

Figure 2:
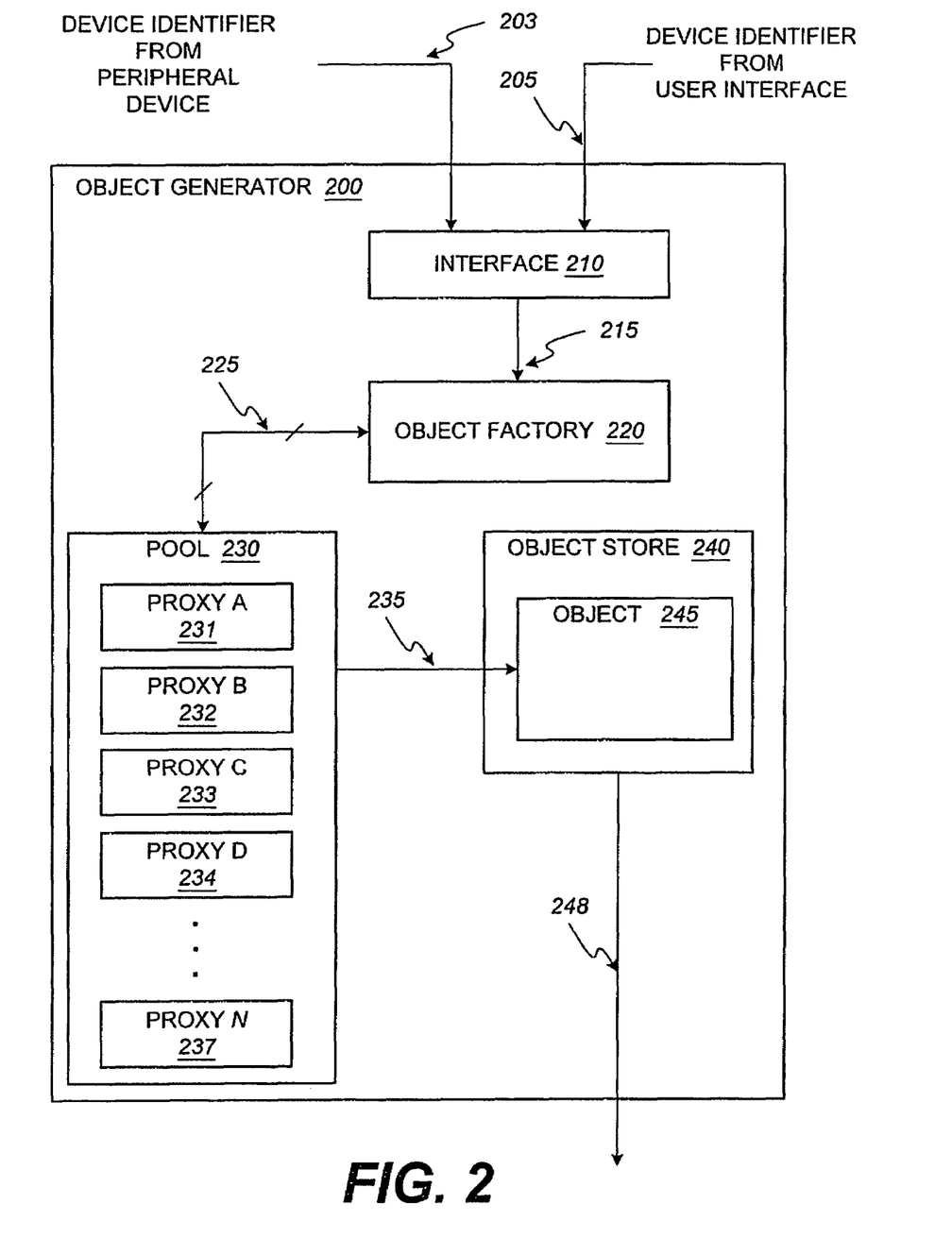
FIG. 2 is a functional block diagram of an embodiment of the object generator of FIG. 1.

FIG. 2 is a functional block diagram of an embodiment of the object generator of FIG. 1. As illustrated in the diagram, interface 210 of the object generator 200 receives input via connection 203 from a peripheral device 130 or via connection 205 from user interface 150. As indicated above, a device identifier received from a peripheral device 130 may include indicia of the manufacturer, model, and various capabilities of a select peripheral device 130. As also indicated above, when a peripheral device 130 is not configured to provide a device identifier, object generator 200 receives one or more identifiers as provided by a user of the computing device 100 via user interface 150. Once indicia of a select peripheral device has been provided, interface 210 forwards the indicia to object factory 220 via connection 215. Object factory 220 in turn polls the pool 230 via connection 225 to determine how many object proxies are available in pool 230 that are programmed to create objects that might be used by the peripheral device 130 that the operator would like to use. Pool 230 responds by indicating the number of available object proxies configured to generate objects associated with the select device type.

In some embodiments, pool 230 will contain related object proxies. Object proxies are related in that the underlying object that they represent can be associated with a peripheral device type. In other embodiments, pool 230 may hold one or more object proxies associated with multiple device types. For example, pool 230 includes object proxies 231, 232, 233, 234, . . . 237 configured to create objects associated with different printers. In other embodiments, pool 230 may include object proxies associated with scanners, cameras, external memory interface devices (e.g., an optical disk drive 134) among other peripheral device types.

Object factory 220 polls each of the identified object proxies, that is, proxy A 231, proxy B 232, proxy C 233, proxy D 234, through proxy N 237, where N is an integer representative of the number of related and available object proxies. Each object proxy responds by returning a confidence level corresponding with the likelihood that the underlying object that the object proxy represents will be able to meet the system need identified in the operator request. For example, when an operator of the computing device 100 desires to send information to printer 132, each of the separate proxies 231-237 generates and returns a confidence level to object factory 220 that corresponds to an expected probability that if the computing device 100 were to use the object generated from the corresponding proxy that the printer would produce an output commensurate with its capabilities. Object factory 220 then directs the object proxy that returned the highest confidence level via connection 225 to create an object. The select object proxy generates the object and forwards the object 245 along connection 235 to object store 240. The dynamically created object 245 can be copied, transferred, or otherwise linked via connection 248 to application(s) 124 operable on computing device 100. It should be understood that each of the various elements of object generator 200 illustrated and described in association with the functional block diagram of FIG. 2, including connections internal and external to object generator 200, can be implemented in both hardware, firmware, and software and any combination thereof. It should be further understood that in some embodiments object generator 200 can be distributed across one or more memory devices and or one or more instruction processing platforms.

Figure 3:
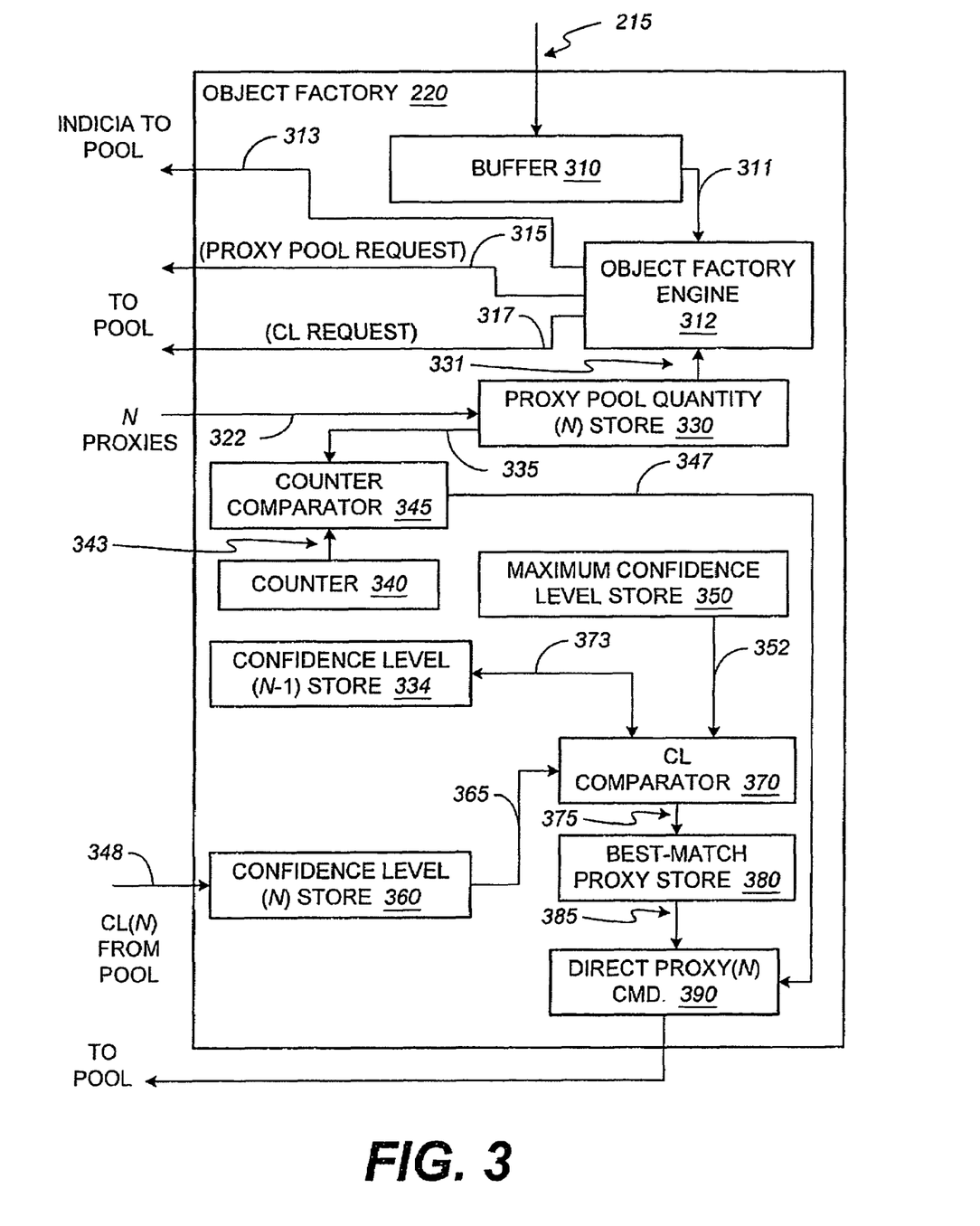
FIG. 3 is a functional block diagram of an embodiment of the object factory of FIG. 2.

FIG. 3 is a functional block diagram of an embodiment of the object factory 200 of FIG. 2. As shown in FIG. 3, object factory 220 includes a number of buffers or stores, comparators, and command generators. Specifically, object factory 220 includes buffer 310 coupled to receive indicia of a system need via input 215. As described above, the indicia can be in the form of one or more peripheral device identifiers generated by a peripheral device that an operator of the computing device 100 desires to use, or the indicia can be in the form of an alphanumeric string representing a device manufacturer, a model number, and in some cases, capabilities or functions of the peripheral device as entered by the operator into interface 150 (FIG. 1).

Buffer 310 is coupled to object factory engine 312 via connection 311. Object factory engine 312 receives the indicia and forwards the indicia via connection 313 to pool 230 (FIG. 2). In addition, object factory engine 312 generates and forwards a proxy pool request via connection 315 to pool 230. In response to the proxy pool request, the pool 230 returns an indication of the number of available proxies associated with the requested peripheral device type via connection 322. As illustrated in FIG. 3, the number of available proxies, N, is forwarded to proxy pool quantity store 330, which then forwards the indication via connection 331 to object factory engine 312.

As further illustrated in FIG. 3, object factory engine 312 generates a confidence level request, which is forwarded in turn to each of the N available proxies within pool 230 via connection 317. Each individual proxy, when polled via the confidence level request, generates and returns a confidence level via connection 348 ranging from a minimum confidence level, which relates to no confidence that an object created by the proxy will enable an application to use the identified peripheral device 130 (FIG. 1), to a maximum confidence level, which relates to a known match of the object to be created with the identified peripheral device 130. The received confidence level can be temporarily retained in confidence level store 360 before being forwarded to confidence level comparator 370 via input 365. Confidence level comparator 370 is configured to receive a maximum confidence level from maximum confidence level store 350 via input 352. In a first comparison operation, confidence level comparator 370 determines if the confidence level received from confidence level store 360 via input 365 matches the maximum confidence level received via input 352.

When it is the case that the confidence level received from confidence level store 360 matches the maximum confidence level, the confidence level comparator 370 is configured to store an identifier corresponding to the proxy that generated the maximum confidence level in best-match proxy store 380. Confidence level comparator 370 communicates the proxy identifier via connection 375 to the best-match proxy store.

When it is the case that the confidence level received from confidence level store 360 fails to match the maximum confidence level provided by maximum confidence level store 350, confidence level comparator 370 compares the confidence level received from the present proxy with a confidence level from a previously received proxy received via connection 373 from confidence level store 334. Confidence level comparator 370 determines which of the two inputs is associated with the highest confidence level and stores an associated proxy identifier in best-match proxy store 380 as well as the highest confidence level in confidence level store 334. Consequently, object factory 220 records both the highest reported confidence level and the proxy that reported the confidence level as the object factory 220 receives each proxy vote from the plurality of object proxies in pool 230.

As each proxy is polled by the object factory 220, counter comparator 345 receives a counter value via input 343 from counter 340 and the number of available proxies, N, via input 335 from quantity store 330. Counter comparator 345 then determines if the value represented in counter 340 is equal to the number of available proxies. The value in counter 340 is incremented by 1 after each confidence level is received from a polled proxy. If the value is not equal, not all proxies have been polled by the object factory 220. Once counter comparator 345 determines that the value in counter 340 has reached the number of available proxies, command generator 390 receives an indication of the best-match proxy via input 385 and generates a command directing the best-match proxy to generate its corresponding object. Command generator 390 forwards the command to pool 230 (FIG. 2) via output 395.

Figure 4:
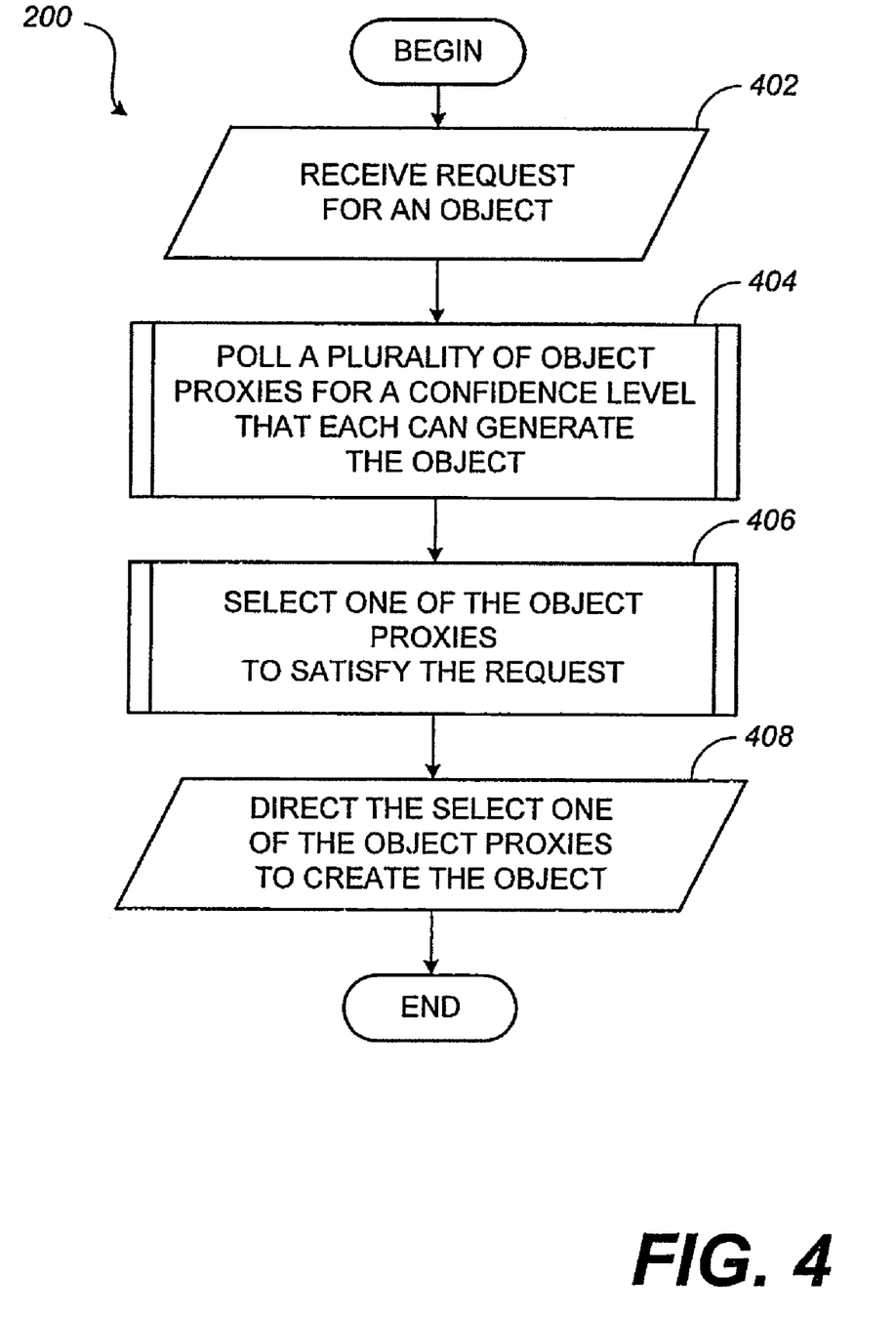
FIG. 4 is a flow chart illustrating an embodiment of a method for creating a best-match object at run time that can be implemented by the object generator of FIG. 2.

Reference is now directed to FIG. 4, which includes a flow chart illustrating an embodiment of a method for creating a best-match object at run time that can be implemented by the object generator 200 of FIG. 2. As illustrated in FIG. 4, the method begins with object generator 200 receiving a request for an object as indicated in block 402. In response to the request, as illustrated in block 404, the object generator 200 polls a plurality of object proxies for a confidence level that each object proxy can generate the requested object. After polling each of the object proxies for a confidence level, object generator 200 selects one of the object proxies in an attempt to satisfy the request, as shown in block 406. Once the object generator 200 has selected an object proxy, the object generator 200 directs the select one of the plurality of object proxies to create the proxy as illustrated in block 408.

Figure 5:
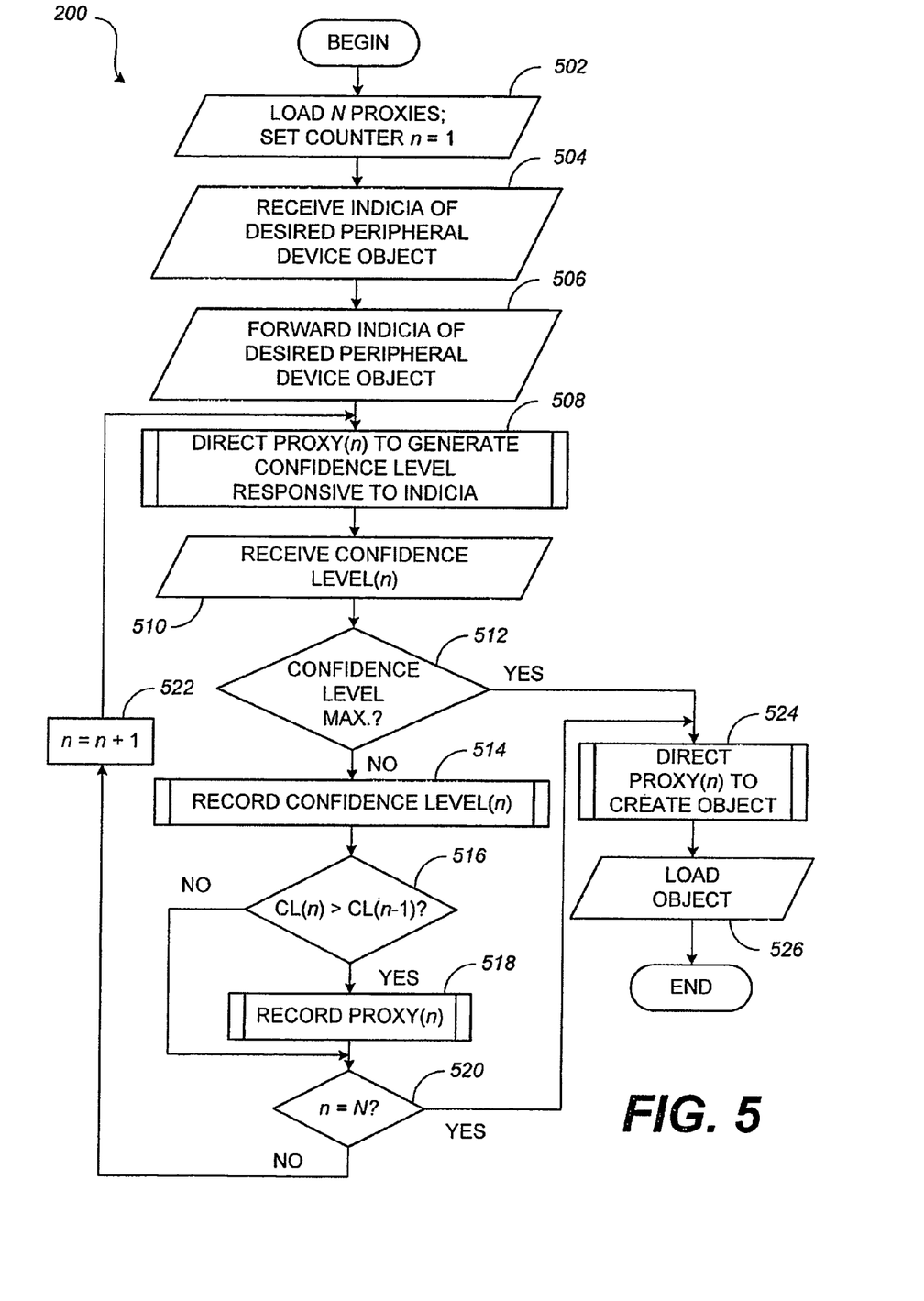
FIG. 5 is a flow chart illustrating an embodiment of a method for polling and selecting a best-match proxy that can be implemented by the object generator of FIG. 2.

FIG. 5 is a flow chart illustrating an embodiment of a method for polling and selecting a best-match proxy that can be implemented by the object generator 200 of FIG. 2. As shown in FIG. 5, the method begins with block 502 where the object generator 200 loads an integer representing the number of available object proxies and initializes a counter. As indicated in block 504, the object generator 200 receives indicia of a desired peripheral device that the object to be created is intended to support.

Next, in block 506, the object generator forwards the indicia of the desired peripheral device. Thereafter, the object generator 200 directs a proxy to generate a confidence level responsive to the indicia as indicated in block 508. In block 510, the object generator 200 receives the confidence level from the proxy. As indicated in query 512, the object generator 200 then determines if the received confidence level is equivalent to a maximum confidence level. When the received confidence level is not equal to a maximum confidence level, as indicated by the flow control arrow exiting query 512 labeled "NO," the object generator records the confidence level as indicated in block 514.

Processing continues with query 516 where the object generator 200 determines if the received confidence level exceeds a previously recorded confidence level. When the received confidence level exceeds a previously recorded confidence level, as indicated by the flow control arrow labeled "YES" exiting query 516, object generator records an identifier associated with the proxy that forwarded the received confidence level as shown in block 518. Otherwise, when it is the case that the received confidence level does not exceed a previously received confidence level as indicated by the flow control arrow labeled "NO" exiting query 516, the function in block 518, i.e., recording the proxy, is bypassed. Processing continues with object generator 200 performing query 520 to determine if all available proxies have provided an associated confidence level. When it is the case that not all proxies have been polled, as indicated by the flow control arrow labeled "NO" exiting query 520, the counter is incremented as indicated in block 522 and object generator 200 repeaters the functions of blocks 508 through 522 until one of the proxies indicates that it is a match, that is, when a proxy responds with a confidence level that is equal to the maximum confidence level as indicated by the flow control arrow labeled "YES" exiting query 512 or it is the case that all proxies have responded as indicated by the flow control arrow labeled "YES" exiting query 520.

Once either of query 512 or query 520 has been satisfied, processing continues with block 524 where object generator 200 directs the proxy that responded with the highest confidence level to create the object. Thereafter, the object is loaded or otherwise made available to the computing device 100 as indicated in block 526.

Any process descriptions or functions in the flow charts presented in FIGS. 4 and 5 should be understood to represent modules, segments, or portions of code or logic, which include one or more executable instructions for implementing specific logical functions in the associated process. Alternate implementations are included within the scope of the disclosed methods in which functions may be executed out of order from that shown or discussed, including substantially concurrently or in reverse order, depending on the functionality involved, as would be understood by those reasonably skilled in the art after having become familiar with the object generator 200 and methods for creating best-match objects at run time. For example, the embodiment of the method for creating a best-match object at run time illustrated in FIG. 5 indicates that object generator 200 initializes a counter and determines the number of available proxies in function 502 and receives indicia of a desired object in function 504. These functions can be performed in reverse order or substantially simultaneously as would be understood by those skilled in the art.

Figure 6:
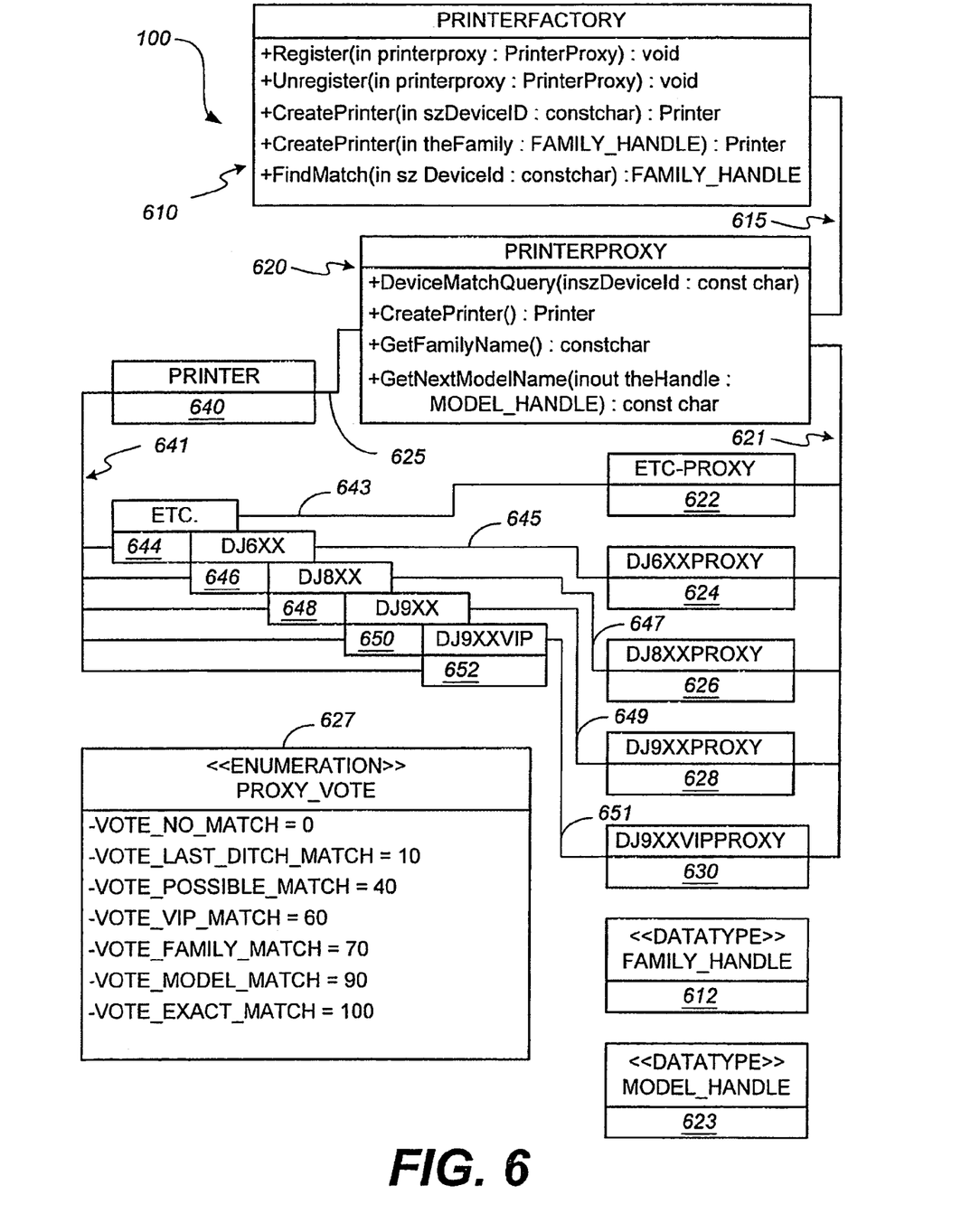
FIG. 6 is a schematic diagram illustrating an embodiment of a method for creating a printer driver that can be implemented by the computing device of FIG. 1.

FIG. 6 is a schematic diagram illustrating an embodiment of a method for creating a printer driver that can be implemented by the computing device 100 of FIG. 1. As illustrated in the diagram, printer factory 610 searches for the best match among a plurality of printer driver proxies by communicating with the printer proxy interface 620 via connection 615. As indicated in the diagram, printer factory 610 uses a first data type 612 labeled, "<<FAMILY_HANDLE>>" to coordinate and monitor communications with printer proxy 620. Printer proxies, represented by interface 620 use a second data type labeled "<<MODEL_HANDLE>>" to coordinate and communicate details about supported device models.

As indicated in the diagram, printer factory 610 is configured to separately poll a first printer driver proxy 630 configured to generate a driver for a Hewlett-Packard DeskJet® 9XX-VIP printer via printer proxy interface 620. Upon receipt of a printer family name, a printer model name, or some other information that can be used to classify a set of printers, the printer factory 610 forwards the information to the first printer driver 630, via interface 620, along with an instruction for the printer driver proxy 630 to provide a confidence level via a proxy vote 627. When the identifying information indicates that the desired printer is a Hewlett-Packard DeskJet® 9XX-VIP series printer, the first printer driver proxy 630 will return a confidence level of 100 via the proxy vote 627. When the identifying information indicates that the desired printer is a Hewlett-Packard DeskJet® 9XX printer the first printer driver proxy 630 will return a confidence level below the maximum confidence level of 100. For example, first printer driver proxy 630 may return a confidence level of 70 or 90 depending on how close the model number (i.e., the characters "XX" in the model number of the identifier) matches the proxy.

Each of the remaining printer driver proxies 628, 626, 624, and 622 are similarly polled until either all are polled or one of the printer device proxies returns a maximum confidence level to the printer factory 610. Once either of these two conditions has been satisfied, the printer factory 610 uses interface 620 to direct the printer device proxy that returned the highest confidence level to create an associated object, in this example, a printer driver. As indicated in the diagram, when printer device proxy 622 is directed to create an object, the printer device proxy 622 generates the printer driver labeled "ETC." 644 via connection 643. When printer device proxy 624 is directed to create an object, printer device proxy 624 generates the printer driver labeled "DJ6XX" 646 via connection 645. When printer device proxy 626 is directed to create an object, printer device proxy 626 generates the printer driver labeled "DJ8XX" 648 via connection 647. When printer device proxy 628 is directed to create an object, printer device proxy 628 generates the printer driver labeled "DJ9XX" 650 via connection 649. When printer device proxy 630 is directed to create an object, printer device proxy 630 generates the printer driver labeled "DJ9XXVIP" 652 via connection 651. Once the select object has been created by one of the available printer device proxies, a printer interface 640 representing the dynamically generated object is returned to the printer factory 610 using interface 620.

Blocks or functions in the block diagrams and schematics illustrated in FIGS. 1-3 and FIG. 6 should be understood to represent modules, segments, portions of code or logic, or data processed by logic. That is, the blocks or functions include one or more executable instructions for implementing specific logical functions in the associated process. Alternate implementations are included within the scope of the disclosed object generator 200 and methods for creating a best-match object in which functions may be executed out of order from that shown or discussed, including substantially concurrently or in reverse order, depending on the functionality involved, as would be understood by those reasonably skilled in the art.

We claim:

1. A method for creating a best-match object at run time, comprising the steps of:
   receiving a request for an object;
   polling object proxies for a confidence level representing the capability of each respective proxy to generate the requested object;
   selecting one of the proxies based on the polled confidence level; and
   directing the selected proxy to create the object,
   wherein the step of selecting one of the proxies comprises comparing and determining which of a first confidence level associated with a first object proxy and a second confidence level associated with a second object proxy is more likely to produce an object most responsive to a system need,
   wherein when a maximum confidence level is recognized, directing the object proxy associated with the maximum confidence level to create the object, and
   wherein when a maximum confidence level is failed to be recognized, directing the object proxy associated with a greatest confidence level to create the object.

2. The method of claim 1, wherein the step of receiving a request for an object comprises receiving indicia of a peripheral device.

3. The method of claim 2, wherein indicia comprises a device identifier.

4. The method of claim 1, wherein the step of selecting one of the proxies comprises comparing each confidence level with a previously received confidence level.

5. The method of claim 1, wherein the step of selecting one of the proxies comprises storing an index associated with a proxy having a greater confidence level.

6. The method of claim 1, wherein the step of directing the select one of the proxies to create the object generates a peripheral device driver.

7. The method of claim 1, further comprising the step of:
   registering a new proxy capable of creating an object designated for use with a new peripheral device.

8. A system, comprising an object generator and a processor operable to execute the object generator, the object generator including instructions that when executed by the processor function as:
  means for receiving indicia of an object to be created;
  means for identifying a select one of a plurality of object proxies responsive to a respective confidence level associated with each object proxy; and
  means for directing the selected object proxy to create the object,
  wherein the means for identifying a select one of a plurality of object proxies comprises means for comparing and determining which of a first confidence level associated with a first object proxy and a second confidence level associated with a second object proxy is more likely to produce an object most responsive to a system need,
  wherein when a maximum confidence level is recognized, means for directing the object proxy associated with the maximum confidence level to create the object, and
  wherein when a maximum confidence level is failed to be recognized, means for directing the object proxy associated with a greatest confidence level to create the object.

9. The system of claim 8, wherein the means for receiving is responsive to a user interface.

10. The system of claim 8, wherein the means for receiving is responsive to a communication from a device associated with the object.

11. The system of claim 8, wherein the means for identifying a select one of a plurality of object proxies comprises means for comparing each respective confidence level with a previously received confidence level.

12. The system of claim 8, wherein the means for identifying a select one of a plurality of object proxies comprises means for comparing each confidence level with a maximum confidence level.

13. The system of claim 12, wherein the means for identifying a select one of a plurality of object proxies identifies an object proxy that returns the maximum confidence level as the selected object proxy.

14. A system, comprising an object generator and a processor operable to execute the object generator, the object generator including instructions that when executed by the processor function as:
  an object factory configured to poll object proxies capable of producing respective objects responsive to system needs; and
  a pool including the object proxies for producing the object, the pool configured to receive indicia of the object from the object factory and each of the plurality of object proxies configured to return a respective confidence level responsive to the indicia,
  wherein the object factory comprises a comparator configured to determine which of a first confidence level associated with a first object proxy and a second confidence level associated with a second object proxy is more likely to produce an object most responsive to the system need,
  wherein when the comparator recognizes a maximum confidence level, the object factory is configured to direct the object proxy associated with the maximum confidence level to create an object, and
  wherein when the comparator fails to recognize a maximum confidence level, the object factory is configured to direct the object proxy associated with a greatest confidence level to create an object.

15. The system of claim 14, further comprising:
  an interface associated with the object factory, the interface configured to receive a request for the object.

16. The system of claim 15, wherein the interface is configured to communicate with a user interface.

17. The system of claim 15, wherein the interface is configured to communicate with a device that will interact with the object.

18. The system of claim 15, wherein the interface is configured to receive a device identifier.

19. The system of claim 15, wherein the interface is configured to receive a device identifier associated with a printer.

20. The system of claim 14, further comprising:
  an object store configured to receive an object generated by an object proxy.

21. A system, comprising an object generator and a processor operable to execute the object generator, the object generator including instructions that when executed by the processor function as:
  an object factory configured to receive a device identifier;
  a pool having an interface configured to communicate with the object factory, the pool containing object proxies capable of producing respective objects; and
  an object store coupled to the pool and configured to receive and retain objects generated by selected object proxies;
  wherein the object factory is configured to poll a plurality of object proxies for a confidence level representing the capability of the respective object proxy to generate an object suited for operating with a device responsive to the device identifier,
  wherein the object factory comprises a comparator configured to determine which of a first confidence level associated with a first object proxy and a second confidence level associated with a second object proxy is more likely to produce an object most responsive to the system need,
  wherein when the comparator recognizes a maximum confidence level, the object factory is configured to direct the object proxy associated with the maximum confidence level to create the object, and
  wherein when the comparator fails to recognize a maximum confidence level, the object factory is configured to direct the object proxy associated with a greatest confidence level to create the object.

22. A method for creating a best-match object at run time comprising the steps of:
  loading a set of object proxies;
  receiving indicia of a desired object for communicating with a peripheral device;
  directing each of the object proxies to forward a confidence level representing the capability of each respective proxy to generate the desired object responsive to the indicia;
  receiving a confidence level associated with an object proxy;
  comparing the confidence level to a maximum confidence level, when the confidence level matches the maximum confidence level, directing the associated object proxy to generate an object, otherwise, recording the confidence level; and
  determining if the confidence level exceeds the confidence level associated with a previously recorded confidence level, when the confidence level exceeds a previously recorded confidence level, recording an object proxy identifier, otherwise, determining if there are additional object proxies in the set, when there are additional object proxies, repeating the receiving a confidence level, comparing, and determining if the confidence level exceeds steps, otherwise, using the object proxy identifier to direct the associated object proxy to generate an object.

23. A computer-readable medium storing instructions executable by a processor, the instructions comprising:
   logic configured to load a set of object proxies, each object proxy configured to generate a respective object;
   logic configured to receive indicia of a desired object for communicating with a peripheral device;
   logic configured to direct each of the object proxies to forward a confidence level representing the capability of each respective proxy to generate the desired object;
   logic configured to receive the confidence level from respective object proxies;
   logic configured to compare the confidence level to a maximum confidence level, when the confidence level matches the maximum confidence level, the associated object proxy is directed to generate an object, otherwise, the logic records the confidence level; and determines if the confidence level exceeds the confidence level associated with a previously recorded confidence level, when the confidence level exceeds a previously recorded confidence level, the logic records an object proxy identifier, otherwise, the logic determines if there are additional object proxies in the set, when there are additional object proxies, the logic receives a confidence level associated with an object proxy that has not reported a confidence level, and repeats the maximum confidence level and previously recorded confidence level comparisons, otherwise, the logic uses the object proxy identifier to direct the associated object proxy to generate an object.

24. A method for creating a best-match printer driver, comprising the steps of:
   receiving a request to use a printer;
   polling printer driver proxies for a confidence level representing the capability of each respective printer driver proxy to generate a driver that when applied to data and forwarded to the printer will produce a useful representation of the data;
   selecting one of the printer driver proxies based on the polled confidence level; and
   directing the selected printer driver proxy to generate the driver,
   wherein the step of selecting one of the printer driver proxies comprises:
   comparing the confidence level to a maximum confidence level, wherein when the confidence level matches the maximum confidence level, directing the associated printer driver proxy to generate the driver, otherwise, recording the confidence level; and
   determining if the confidence level exceeds the confidence level associated with a previously recorded confidence level, wherein when the confidence level exceeds the previously recorded confidence level, recording an identifier of the printer driver proxy, otherwise, determining if there are additional printer driver proxies, wherein when there are additional printer driver proxies, repeating the polling, comparing, and determining steps, otherwise, using the identifier to direct the associated printer driver proxy to generate the driver.

25. The method of claim 24, wherein the step of receiving a request to use a printer comprises receiving a device identifier.

26. The method of claim 24, wherein the step of receiving a request to use a printer comprises receiving indicia of a printer capability.

27. The method of claim 24, wherein the step of selecting one of the printer driver proxies comprises comparing each confidence level with a previously received confidence level.

28. The method of claim 24, wherein the step of selecting one of the printer driver proxies comprises storing an index associated with a printer driver proxy having a greater confidence level.

29. A computer-readable medium storing instructions executable by a processor, the instructions comprising:
   logic configured to receive a request to use a printer;
   logic configured to poll printer driver proxies for a confidence level representing the capability of each respective printer driver proxy to generate a driver that when applied to data and forwarded to the printer will produce a useful representation of the data;
   logic configured to select one of the printer driver proxies based on the polled confidence level; and
   logic configured to direct the selected printer driver proxy to generate the driver,
   wherein the logic configured to select one of the printer driver proxies is configured to:
   compare the confidence level to a maximum confidence level, wherein when the confidence level matches the maximum confidence level, direct the associated printer driver proxy to generate the driver, otherwise, record the confidence level; and
   determine if the confidence level exceeds the confidence level associated with a previously recorded confidence level, wherein when the confidence level exceeds the previously recorded confidence level, record an identifier of the printer driver proxy, otherwise, determine if there are additional printer driver proxies, wherein when there are additional printer driver proxies, repeat the polling, comparing, and determining, otherwise, use the identifier to direct the associated printer driver proxy to generate the driver.

30. The computer-readable medium of claim 29, wherein the logic configured to receive a request to use a printer is configured to receive a device identifier.

31. The computer-readable medium of claim 29, wherein the logic configured to receive a request to use a printer is configured to receive indicia of a printer capability.

32. The computer-readable medium of claim 29, wherein the logic configured to select one of the printer driver proxies is configured to compare confidence levels with a previously received confidence level.

33. The computer-readable medium of claim 29, wherein the logic configured to select one of the printer driver proxies is configured to store an index associated with a printer driver proxy having a greater confidence level.

* * * * *

UNITED STATES PATENT AND TRADEMARK OFFICE
CERTIFICATE OF CORRECTION

PATENT NO. : 7,610,587 B2  Page 1 of 1
APPLICATION NO. : 10/702151
DATED : October 27, 2009
INVENTOR(S) : John L. Manuel et al.

It is certified that error appears in the above-identified patent and that said Letters Patent is hereby corrected as shown below:

In column 12, line 46, in Claim 22, delete "time" and insert -- time, --, therefor.

Signed and Sealed this

Second Day of February, 2010

David J. Kappos
*Director of the United States Patent and Trademark Office*